United States Patent [19]

Chen et al.

[11] Patent Number: 6,047,080

[45] Date of Patent: *Apr. 4, 2000

[54] METHOD AND APPARATUS FOR THREE-DIMENSIONAL RECONSTRUCTION OF CORONARY VESSELS FROM ANGIOGRAPHIC IMAGES

[75] Inventors: Shiuh-Yung James Chen; John D. Carroll, both of Chicago; Charles E. Metz, Burr Ridge; Kenneth R. Hoffmann, Matteson, all of Ill.

[73] Assignee: Arch Development Corporation, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/665,836

[22] Filed: Jun. 19, 1996

[51] Int. Cl.[7] ...................................................... G06K 9/00
[52] U.S. Cl. ........................................... 382/128; 434/272
[58] Field of Search .................................... 382/128–134, 382/262; 378/4, 901, 9, 8; 128/653.1; 434/272; 623/1; 600/483

[56] References Cited

U.S. PATENT DOCUMENTS 4,875,165  10/1989  Fencil et al. ........................ 364/413.22

OTHER PUBLICATIONS

Blais, G., et al., Registering Multiview Range Data to Create 3D Computer Objects, IEEE Transactions on Pattern Analysis and Machine Intelligence, vol. 17, No. 8, p. 820–4, Aug. 1995.

Medical Imaging 1996—Image Processing, "Three–dimensional reconstruction of coronary arterial tree based on biplane angiograms" authored by Shiuh–Yung J. Chen, John D. Carroll, and Kenneth R. Hoffmann, Feb. 12–15, 1996, Newport Beach, California, Proceedings–SPIE—The International Society for Optical Engineering, vol. 2710, 13 pages.

IEEE Computer Society Press Reprint—Reprinted from Proceedings of Computers in Cardiology 1994, "Improved Determination Of BiPlane Imaging Geometry And 3D Coronary Arterial Tree From Two Views," authored by S.Y. Chen, C.E. Metz, C.R. Hoffmann and J.D. Carroll, Bethesda, Maryland, Sep. 25–28, 1994, 5 pages.

International Search Report, International Application No. PCT/US97/10194—Form PCT/ISA/210, pp. 1 and 2.

Wahle, Oswald, and Fleck, A New 3–D Attributed Data Model for Archiving and Interchanging of Coronary Vessel Systems, German Heart Institute, Berlin, Germany, May 1993, pp. 603–606.

(List continued on next page.)

*Primary Examiner*—Jon Chang
*Assistant Examiner*—Jayanti K. Patel
*Attorney, Agent, or Firm*—Welsh & Katz, Ltd.

[57] ABSTRACT

A method for in-room computer reconstruction of a three-dimensional (3-D) coronary arterial tree from routine biplane angiograms acquired at arbitrary angles and without using calibration objects. The method includes eight major steps: (1) acquiring biplane projection images of the coronary structure, (2) detecting, segmenting and identifying vessel centerlines and constructing a vessel hierarchy representation, (3) calculating bifurcation points and measuring vessel diameters in coronary angiograms if biplane imaging geometry data is not available, (4) determining biplane imaging parameters in terms of a rotation matrix R and a unit translation vector $\vec{t}$ based on the identified bifurcation points, (5) retrieving imaging parameters if biplane imaging geometry data is already known, (6) establishing the centerline correspondences of the two-dimensional arterial representations, (7) calculating and recovering the 3-D coronary arterial tree based on the calculated biplane imaging parameters, correspondences of vessel centerlines, and vessel diameters, and (8) rendering the reconstructed 3-D coronary tree and estimating an optimal view of the vasculature to minimize vessel overlap and vessel foreshortening.

23 Claims, 6 Drawing Sheets

OTHER PUBLICATIONS

Dalaere, Smets, Suetens, and Marchal, Knowledge–Based System for the Three–Dimensional Reconstruction of Blood Vessels from Two Angiographic Projections, Medical and Biological Engineering Computing, Nov. 1991, pp. NS27–NS36.

Yanagihara, Hashimoto, Sugahara, and Sugimoto, A New Method for Automatic Identification of Coronary Arteries in Standard Biplane Angiograms, International Journal of Cardiac Imaging, 1994, pp. 253–261.

Liu and Sun, Fully Automated Reconstruction of Three–Dimensional Vascular Tree Structures from Two Orthogonal Views Using Computational Algorithms and Production Rules, Optical Engineering, Oct. 1992, vol. 31, No. 10, pp. 2197–2207.

Pellot, Herment, Sigelle, Horain, Maitre, and Peronneau, A 3D Reconstruction of Vascular Structures from Two X–Ray Angiograms Using an Adapted Simulated Annealing Algorithm, IEEE Transactions on Medical Imaging, Mar. 1994, vol. 13, No. 1, pp. 48–60.

Nguyen and Sklansky, Reconstructing the 3–D Medical Axes of Coronary Arteries in Single–View Cineaniograms, IEEE Transactions on Medical Imaging, Mar. 1994, vol. 13, No. 1, pp. 61–73.

Whale, Wellnhofer, Magaragu, Sauer, Oswald, and Fleck, Assessment off Diffuse Coronary Artery Disease by Quantitative Analysis of Coronary Morphology Based Upon 3–D Reconstruction from Biplane Angiograms, IEEE Transactions on Medical Imaging, Jun. 1995, vol. 14, No. 2., pp. 230–241.

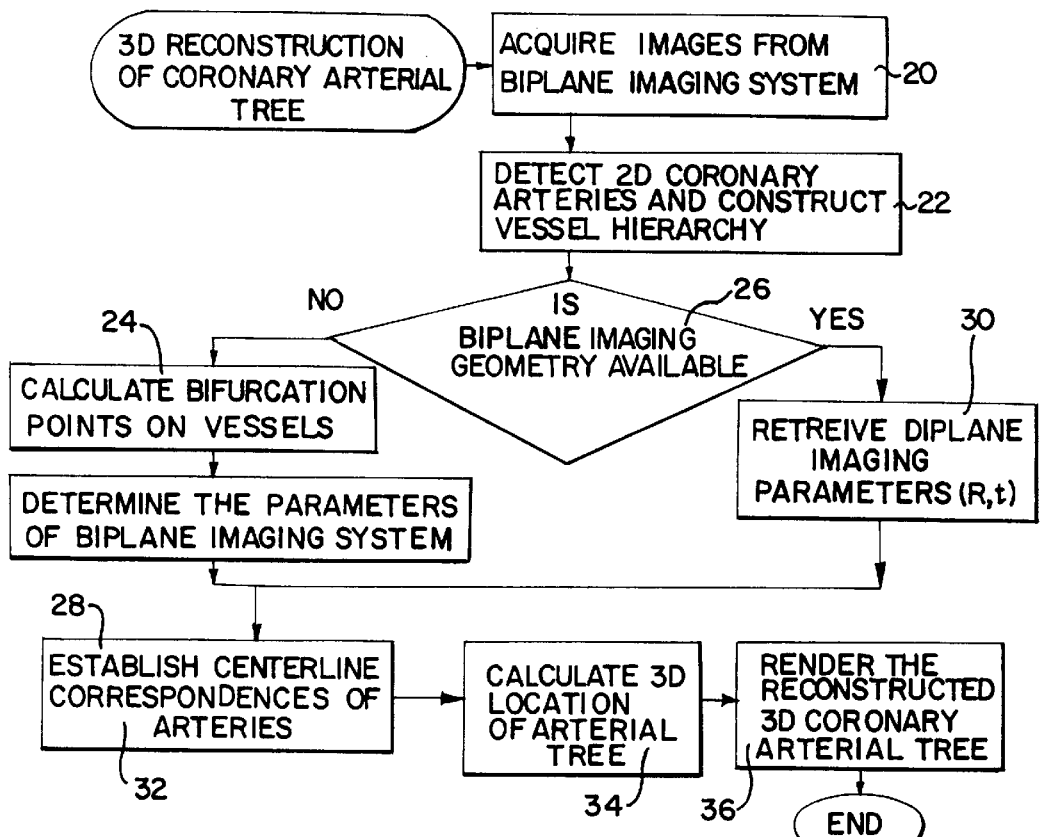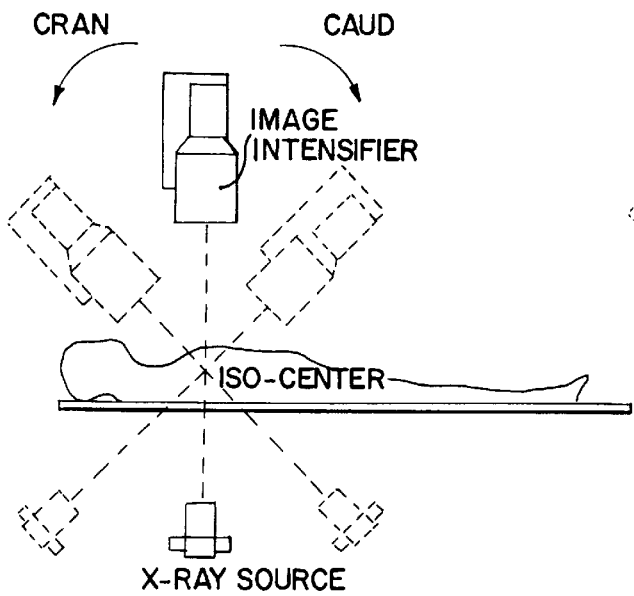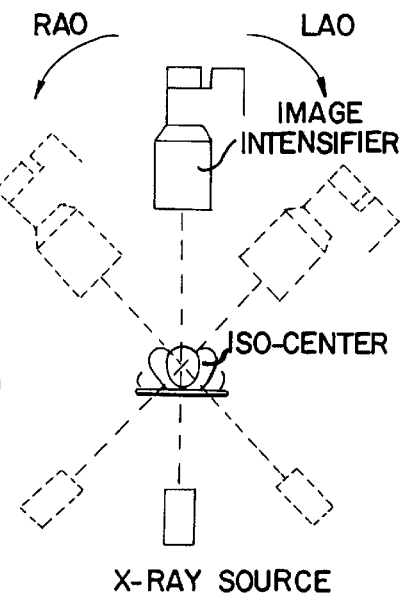

METHOD AND APPARATUS FOR THREE-DIMENSIONAL RECONSTRUCTION OF CORONARY VESSELS FROM ANGIOGRAPHIC IMAGES

The U.S. Government has rights in this invention pursuant to Grant No. CA47043 awarded by the National Institute of Health.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to a method for reconstructing images of coronary vessels and more specifically to a method for three-dimensional (3-D) reconstruction of coronary vessels from two two-dimensional biplane projection images.

Several investigators have reported computer assisted methods for estimation of the 3-D coronary arteries from biplane projection data. These known methods are based on the known or standard X-ray geometry of the projections, placement of landmarks, known vessel shape, and on iterative identification of matching structures in two or more views. Such methods are described in a publication entitled "3-D digital subtraction angiography," IEEE Trans. Med. Imag., vol. MI-1, pp. 152–158, 1982 by H. C. Kim, B.G. Min, T. S. Lee, et. al. and in a publication entitled "Methods for evaluating cardiac wall motion in 3-D using bifurcation points of the coronary arterial tree," Invest. Radiology, January–February pp. 47–56, 1983 by M. J. Potel, J. M. Rubin, and S. A. Mackay, et al. Because the computation was designed for predefined views only, it is not suitable to solve the reconstruction problem on the basis of two projection images acquired at arbitrary and unknown relative orientations.

Another known method is based on motion and multiple views acquired in a single-plane imaging system. Such a method is described in a publication entitled "Reconstructing the 3-d medial axes of coronary arteries in single-view cineangiograms," IEEE Trans. MI, vol. 13, no. 1, pp. 48–60, 1994 by T. V. Nguyen and J. Sklansky uses motion transformations of the heart model. However, the motion transformations of the heart model consist only of rotation and scaling. By incorporation of the center-referenced method, initial depth coordinates, and center coordinates, a 3-D skeleton of the coronary arteries was obtained. However, the real heart motion during the contraction involves five specific movements: translation, rotation, wringing, accordion-like motion, and movement toward the center of the ventricular chamber. Therefore, the model employed is not general enough to portray the true motion of the heart, especially toward the end-systole.

Knowledge-based or rule-based systems have been proposed for 3-D reconstruction of coronary arteries by use of a vascular network model. One such knowledge-based system is described in a publication entitled "An expert system for the labeling and 3-D reconstruction of the coronary arteries from two projections," International Journal of Imaging, Vol. 5, No. 2–3, pp. 145–154, 1990 by Smets, Vandewerf, Suctens, and Oosterlinck. Because the rules or knowledge base were organized for certain specific conditions, it does not generalize the 3-D reconstruction process to arbitrary projection data. In other knowledge-based systems, the 3-D coronary arteries were reconstructed from a set of X-ray perspective projections by use of an algorithm from computed tomography. Due to the motion of the heart and only a limited number of projections (four or six), accurate reconstruction and quantitative measurement are not easily achieved.

Closed-form solutions of the 3-D reconstruction problem using a linear approach was a significant development and is described in, for example, a publication entitled "Determining 3-d motion and structure of a rigid body using the spherical projection," CVGIP, vol. 21, pp. 21–32, 1983 by B. L. Yen and T. S. Huang. Unfortunately, actual data is always corrupted by noise or errors and the linear approach based techniques may not be sufficiently accurate when using noisy data. Hence, optimal estimation has been explicitly investigated. Additionally, U.S. Pat. No. 4,875,165 entitled Method for Determination of 3-D Structures in Biplane Angiography issued in the name of Fencil et al. also has significant drawbacks.

Use of a two-step method is known for producing an optimal estimation for a 3-D structure based on maximum-likelihood and minimum-variance estimation. In these techniques, for example, two publications entitled "Optimal motion and structure estimation," IEEE Trans. on PAMI, Vol. 15, no. Sep. 9, 1993, pp. 864–884, and "Structure from motion using the reconstruction and projection technique," Proc. IEEE Workshop Computer Vision, November 1987, pp. 345–348, image error was employed in the objective function for a non-constricted minimization process. Preliminary estimates computed by a linear algorithm were used as initial estimates for the process of optimal estimation. However, if the initial solution from the linear approach is not sufficient, (e.g., with more than 2 pixels=0.6 mm error in the input 2-D image data), the iterative minimization process at the second step may become trapped in a local minimum due to a lack of prior information concerning the variables to be optimized.

Accordingly, it is an object of the present invention to substantially overcome the above-described problems.

It is another object of the present invention to provide a method for reconstructing three-dimensional coronary structures given two-dimensional projection images.

It is a further object of the present invention to provide a method for reconstructing three-dimensional coronary structures given two-dimensional projection images where the relative orientation between the two-dimensional images is unknown.

It is also an object of the present invention to provide a method for reconstructing an optimal visual three-dimensional representation of coronary structures where vessel overlap and vessel foreshortening are minimized.

It is still an object of the present invention to provide a method for reconstructing an optimal visual three-dimensional representation of coronary structures where the orientation parameters are used to produce further images of the target object

SUMMARY OF THE INVENTION

The disadvantages of present methods known for visual reconstruction of coronary vessels are substantially overcome with the present invention by providing a novel method for three-dimensional reconstruction of coronary arteries using two-dimensional angiograms.

In the present inventive method, a novel optimization technique minimizes the image point errors in both imaging systems subject to the constraints derived from the individual intrinsic imaging parameters of the employed imaging system. Given five or more corresponding object points in both views (projection image), a constrained nonlinear optimization algorithm is applied to obtain an optimal estimate (transformation) of the biplane imaging geometry in the form of R and $\vec{t}$ which characterize the position and orientation of one imaging system (imaging portion of the imaging system) relative to the other. The initial solution is estimated on the basis of the individual intrinsic imaging parameters.

Angiograms of fifteen patients were analyzed in which two cases are selected for discussion hereinafter. The biplane imaging geometry was first determined without a calibration object, and the 3-D coronary arterial trees were reconstructed, including both left and right coronary artery systems. Various two-dimensional (2-D) projection images of the reconstructed 3-D coronary arterial tree were generated and compared to other viewing angles obtained in the actual patient study. Similarity between the real and reconstructed arterial structures was excellent. The accuracy of this method was evaluated by using a computer-simulated coronary arterial tree. Root-mean-square (RMS) errors in the 3-D position and the 3-D configuration of vessel centerlines and in the angles defining the R matrix and $\vec{t}$ vector were 0.9–5.5 mm, 0.7–1.0 mm, and less than 1.5 and 2.0 degrees, respectively, when using 2-D vessel centerlines with RMS normally distributed errors varying from 0.4–4.2 pixels (0.25–1.26 mm).

More specifically, the method for three-dimensional reconstruction of a target object from two-dimensional images involves a target object having a plurality of branch-like vessels. The method includes the steps of: a) placing the target object in a position to be scanned by an imaging system, the imaging system having a plurality of imaging portions; b) acquiring a plurality of projection images of the target object, each imaging portion providing a projection image of the target object, each imaging portion disposed at an unknown orientation relative to the other imaging portions; c) identifying two-dimensional vessel centerlines for a predetermined number of the vessels in each of the projection images; d) creating a vessel hierarchy data structure for each projection image, the data structure including the identified two-dimensional vessel centerlines defined by a plurality of data points in the vessel hierarchy data structure; e) calculating a predetermined number of bifurcation points for each projection image by traversing the corresponding vessel hierarchy data structure, the bifurcation points defined by intersections of the two-dimensional vessel centerlines; f) determining a transformation in the form of a rotation matrix and a translation vector utilizing the bifurcation points corresponding to each of the projections images, the rotation matrix, and the translation vector representing imaging parameters corresponding to the relative orientations of the imaging portions of the imaging system; g) utilizing the data points and the transformation to establish a correspondence between the two-dimensional vessel centerlines corresponding to each of the projection images such that each data point corresponding to one projection image is linked to a data point corresponding to the other projection images, the linked data points representing an identical location in the vessel of the target object after the projections; h) calculating three-dimensional vessel centerlines utilizing the two-dimensional vessel centerlines and the correspondence between the data points of the two-dimensional vessel centerlines; and i) reconstructing a three-dimensional visual representation of the target object based on the three-dimensional vessel centerlines and diameters of each vessel estimated along the three-dimensional centerline of each vessel; and j) determining the optimal view of the vessel segments with minimal vessel foreshortening.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 1 is a high level flowchart illustrating the steps according to a specific embodiment of the present inventive method;

FIGS. 2A and 2B are schematic views of the imaging system particularly showing the position of the isocenter;

DETAILED DESCRIPTION OF THE INVENTION

Figure 3A:
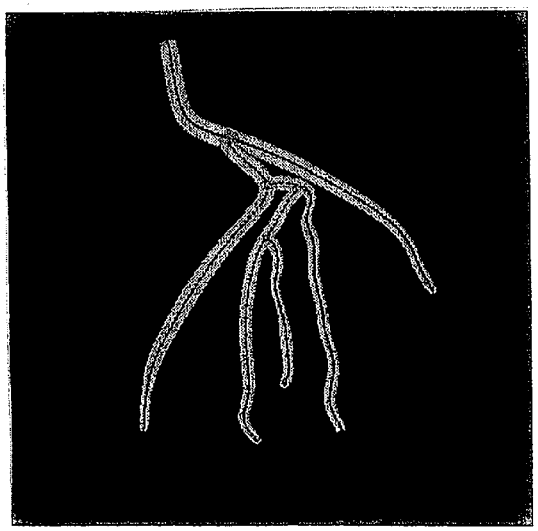
FIGS. 3A–3B are orthogonal views of typical biplane projection images based on a computer simulated coronary arterial tree where each vessel centerline is represented by a sequence of data points.

Referring now to FIG. 1, the present invention method includes eight major steps: (1) acquiring biplane projection images of the coronary structure, as shown in step 20, (2) detecting, segmenting, and identifying vessel centerlines and constructing a vessel hierarchy representation, as illustrated in step 22, (3) calculating bifurcation points and measuring vessel diameters in coronary angiograms, as shown in step 24, but only if biplane imaging geometry data is not available, as shown by the "no" branch of step 26, (4) determining biplane imaging parameters in terms of a rotation matrix R and a unit translation vector $\vec{t}$ based on the identified bifurcation points, as illustrated in step 28, (5) retrieving imaging parameters, as shown in step 30, but only if known biplane imaging geometry data is available, as shown by the "yes" branch of step 26, (6) establishing the centerline correspondences of the two-dimensional arterial representations, as shown in step 32, (7) calculating and recovering the 3-D spacial information of the coronary arterial tree based on the calculated biplane imaging parameters, the correspondences of vessel centerlines, and the vessel diameters, as illustrated in step 34, and (8) rendering the reconstructed 3-D coronary tree and estimating an optimal view of the vasculature to minimize vessel overlap and vessel foreshortening, as shown in step 36. The above-described steps will be described in greater detail herewith.

Acquiring Images from the Biplane Imaging System

As shown in step 20 of FIG. 1, biplane projection images are acquired using an X-ray based imaging system. However, other non-X-ray based imaging systems may be used, as will be described hereinafter. Such X-ray based images are preferably created using a biplane imaging system where two projection images are produced substantially simultaneously. The patient is placed in a position so that the target object, in this illustrated embodiment, the heart, is scanned by the imaging system. The imaging system preferably includes a plurality of imaging portions where each imaging portion provides a projection image of the coronary structure. Due to interference between the imaging portions during X-ray emission, one image portion must be turned off while the other image portion is active. However, the duration of exposure is extremely short so that the two images are sequentially taken such that the heart does not significantly move during the imaging period. Such an imaging system may be, for example, a Seimens BICORE system. It is the time between exposures that must be short. Otherwise blurring of the vessels may result. The motion of the heart is significant throughout most of the heart cycle, thus most investigators use end-diastole.

Referring now to FIG. 1, and FIGS. 2A–2B, FIGS. 2A–2B schematically illustrate a typical imaging system configuration where only one gantry arm is shown for clarity. An X-ray source is located at the focus of a cone shaped X-ray beam which diverges outwardly toward an X-ray image intensifier (image plane or view). The X-ray beam passes through the target object and is received by the X-ray image intensifier. In a biplane system, two such X-ray sources and image intensifiers are present. The gantry arm is rotatably mounted such that the X-ray source and the image intensifier move relative to the target object but always remain fixed relative to each other. The gantry arm permits the X-ray source and the image intensifier to be positioned about the target object in a predetermined orientation.

The present invention is not limited to a biplane imaging system having only two imaging portions. A multi-plane imaging system may be used having a plurality of imaging portions such as, for example, three, four, or more imaging portions, each providing a projection image of the coronary structure. Such an imaging system is essentially limited by the size of the system relative to the treatment facility. The scope of the present inventive method includes use of a system providing two or more projection images.

The projection images may or may not include orientation information describing the relative geometry between the gantry arms. Even if the individual gantry position information is available, the derivation of relative orientation based on the known gantry positions becomes a non-trivial process especially when the two isocenters are not aligned. A significant feature of the present inventive method permits reconstruction of a 3-D model of the target object even when the relative orientation of the gantry arms is unknown. Other prior art methods for reconstruction the 3-D model requires either known relative orientation between the two views, known individual gantry position (resulting in ten parameters for biplane imaging geometry which may be sufficiently defined by five parameters), or at least more that eight pairs of accurate input corresponding points.

The projection images are digitized and are entered into a work station. The projection images are represented by a series of individual pixels limited only by the resolution of the imaging system and the memory of the work station. The work station, for example, may be an IBM RISC/6000 work station or a Silicon Graphics Indigo-2/High Impact work station or the like. An input device, such as a keyboard, a mouse, a light pen, or other known input devices is included to permit the operator to enter data.

Segmentation and Feature Extraction of the Two-Dimensional Coronary Arterial Tree False detection of arteries is inevitable using a fully automatic vessel tracker, especially when vessels overlap or the signal-to-noise ratio of the angiogram is low. In the present inventive method, a semi-automatic system based on a technique using a deformation model is employed for the identification of the 2-D coronary arterial tree in the angiograms, as will be described in greater detail hereinafter. The required user interaction involves only the indication of several points inside the lumen, near the projection of vessel centerline in the angiogram, as is illustrated in step 22 of FIG. 1.

Figure 3B:
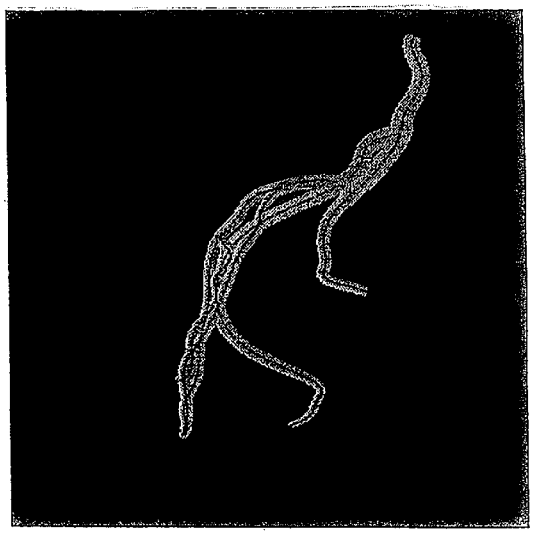

Referring now to FIGS. 3A and 3B, computer simulated biplane projection images are shown. Typically, the operator or the physician inspects the digitized biplane projection images. Using a mouse or other data entry device, the physician marks a series of points (data points) within a major vessel to define the initial two-dimensional centerline of the vessel. After the major vessel has been marked, five additional branching vessels are marked in the same manner such that a total of six two-dimensional centerlines are identified. Once the major vessel has been marked, the remaining five vessels may be identified and marked in any order. Note, for purposes of clarity only, FIGS. 3A and 3B show one major vessel and only four branching vessels.

The above process is then performed for the other biplane projection imrage(s). Again, the operator or the physician identifies and marks the major vessel and then identifies and marks the five additional branching vessels. The branching vessels may be identified and marked in any order, which may be different from the order marked in the first biplane projection image. The physician must mark the same six vessels in each biplane projection image. The present inventive method renders excellent results with use of only six identified vessel centerlines. Other known systems require many more identified data points. An example of such a system is described in a publication entitled "Assessment of Diffuse Coronary Artery Disease by Quantitative Analysis of Coronary Morphology Based Upon 3-D Reconstruction from Biplane Angiograms," IEEE Trans. on Med. Imag., Vol. 14, No. 2, pp. 230–241, 1995 by A. Wahle and E. Wellnhofer et. al. This system requires at least ten or more identified corresponding points due to ten variables that need to be optimized for determination of biplane imaging parameters. Such a burdensome requirement significantly increases computer processing time. Since the derived objective function employs five variables to characterize the biplane imaging geometry, it only requires five corresponding points.

Next, by use of the deformation model and ridge-point operator, described hereinafter, the initially identified centerline is gradually deformed and made to finally reside on the actual centerline of vessel.

Deformation Model

The behavior of the deformation contour is controlled by internal and external forces. The internal forces serve as a smoothness constraint and the external forces guide the active contour toward image features. A deformable contour can be defined as a mapping of a material coordinate $s \in [0, 1]$ into $R^2$.

$$v(s)=(x(s),y(s))$$

Its associated energy function can be defined as the sum of an internal energy and an external energy. The external energy accounts for the image force $F_{img}$, such as a line or edge extracted from the image content, and other external constraint forces $F_{oext}$, such as a pulling force intentionally added by the user. The energy function is the sum of the internal energy and the external energy and is written as:

$$E(v)=E_{int}(v)+E_{ext}(v)=E_{int}(v)+E_{img}(v)+E_{oext}(v) \quad \text{Equ. (A)}$$

The internal energy, which is caused by stretching and bending, characterizes the deformable material and is modeled as:

$$E_{int}(v)=\tfrac{1}{2}\int_0^1\{\alpha(s)|v'(s)|^2+\beta(s)|v''(s)|^2\}ds \quad \text{Equ. (B)}$$

where $\alpha(s)$ and $\beta(s)$ control the tension and the rigidity at point $v(s)$. The first order term, measuring the length of ds, resists stretching, while the second order term, measuring the curvature at ds, resists bending.

Let $\Delta I(v)$ denote the image force at point $v(s)$, which is the directional maximum (or minimum) response of gray level in a region with m by m pixels. These point sources of force are referred to as ridge points which will act on the contour. Based on the image force, the image energy is defined as $$E_{img}(v)=-\tfrac{1}{2}\int_0^1|\Delta I(v(s))|^2 ds \quad \text{Equ. (C)}$$

Here, only the ridge points are considered as the external force. The shape of contour under the forces becomes a problem of minimization of the energy function.

$$E(v)=\tfrac{1}{2}\int_0^1\{\alpha(s)|v'(s)|^2+\beta(s)|v''(s)|^2-|\Delta I(v(s))|^2\}ds \quad \text{Equ. (D)}$$

A necessary condition for a contour function to minimize Equ. (D) is that it must satisfy the following Euler-Lagrange equation:

$$-(\alpha v')'+(\beta v'')''+F_{img}(v)=0 \quad \text{Equ. (E)}$$

When all the forces that act on the contour are balanced, the shape change on the contour is negligible and results in an equilibrium state.

The deformation process starts from an initial contour. The contour modifies its shape dynamically according to the force fields described above until it reaches an equilibrium state. The user manually indicates points near the vessel centerline and a spline-curve is formed based on the selected points. This serves as the initial centerline of the vessel. Without loss of generality, the artery is imaged as dark intensity against the background in the angiogram. According to the densitometric profile model, the 2-D cross-sectional profile of the coronary arteries has a minimum intensity at the vessel centerline. An m by m operator is convolved with a given arterial image by which the ridge pixel is identified if it is a directional minimum on intensity. By use of the deformation model, the set of ridge pixels serves as the external forces which act on the initial model curve such that it will gradually be deformed and finally reside on the real centerline of the vessel.

A computer-based editing tool is employed for the correction in case a false-negative or false-positive detection occurs. The editing tool provides the operator with the ability to change the shape of the vessel centerline. This is done by the modification of control points, such as addition, deletion, or dragging of the points on a spline-based curve that models the vessel centerline.

The identified centerlines and the branching relationships are used to construct the hierarchy in each image by their labeling according to the appropriate anatomy of the primary and secondary coronary arteries. The labeling process on the coronary tree is performed automatically by application of the breadth-first search algorithm to traverse identified vessel centerlines, as is known in the art. From each vessel of the coronary tree that is currently visited, this approach searches as broadly as possible by next visiting all of the vessel centerlines that are adjacent to it. This finally results in a vessel hierarchically directed graph (digraph) containing a set of nodes corresponding to each individual artery and two types of arcs (descendant and sibling arcs) defining the coronary anatomy.

In addition to the coordinates of the vessel centerlines, the relative diameters of the vessels are determined. The diameter of each vessel is estimated based on the maximum vessel diameter at a beginning portion of the vessel and a minimum vessel diameter at an ending portion of the vessel. This step is performed within step 22 (FIG. 1) and is also performed by the operator or the physician. The physician measures the minimum and maximum vessel diameter on the projection image at the beginning of a vessel and at the end of the vessel and enters the data into the work station. Only the minimum and maximum diameters are required since typical values of vessel taper are known and are substantially constant from patient to patient. For example, a vessel may have a maximum diameter of 0.35 mm at the proximal RCA and a minimum diameter of 0.02 mm at the distal RCA. The remaining diameters between the two points can be calculated by linear interpolation based on the maximum and minimum diameters.

Next, a determination is made whether biplane imaging geometry is available, as illustrated in step 26 of FIG. 1. As described above, the geometric orientation of the gantries during exposure may not be available or alternately, if it is available, may require a calibration process. Based on the current imaging technology, the information of a single plane system includes the gantry orientation (LAO and CAUD angles), SID (focal spot to image intensified distance), and magnification. However, such information is defined based on each individual reference system. In other words, the relative orientation that characterizes the two views is unknown. Therefore, it is necessary to determine the biplane geometry. If the two reference points, which are the location of the iso-centers, are made to coincide, the relative orientation can be calculated directly from the recorded information. However, such coincidence of the reference points is difficult to achieve in a practical environment. If the accurate relative orientation data is available from the mechanical hardware of the gantry, steps 32–36 of FIG. 1 may be employed to calculate the 3-D coronary arterial structures. However, it is difficult to obtain biplane transformation data based on current instrumental technology. A significant advantage of the present inventive method is that 3-D reconstruction is accurately rendered from 2-D projection images when such orientation information is unavailable.

If biplane imaging geometry is not available, the bifurcation points are calculated, as shown in step 24 of FIG. 1. An important step in the present inventive method relies on the accurate establishment of correspondence between image features, such as points or curve segments between projections. The bifurcation points on the vascular tree are prominent features and are often recognized in both images to facilitate the determination of biplane imaging geometry. Using the hierarchical digraph, bifurcation points are then calculated by use of each pair of ascendant and descendant nodes (or vessels). Given two sets of 2-D points representing the respective centerlines of vessels constituting a bifurcation, they can be modeled as two curves, $p(r)$ and $q(t)$, where $0 \leq r$, $t \leq 1$ are the parameters based on the spline-based curve-fitting algorithm, such as is described by R. H. Bartels, J. C. Beatty, and B. A. Barsky in a publication entitled "An introduction to splines for use in computer graphics and geometric modeling," Morgan Kaufmann Publishers Inc., Los Altos, Calif., as is known in the art. Let curve q(t) denote the branch of the primary vessel as modeled by a curve, p(r). The bifurcation point can then be obtained by calculation of the intersection of the tangent line denoted as a vector $q_0$ at the point q(0) and the curve of the primary vessel, p(r), by minimizing the objective function $\mathcal{F}_{\{bif\}}(r)$ as follows:

$$\min_r \mathcal{F}_{\{bif\}}(r) = \left\| p(r) - \frac{q_o^T p(r)}{q_o^T q_0} q_o^T \right\|^2 \quad \text{Equ. (F)}$$

$$= \frac{(p^T(r)p(r))(q_o^T q_0) - (q_o^T p(r))^2}{(q_o^T q_0)}$$

subject to $0 \leq r \leq 1$.

The results of $p(\hat{r})$, where $\hat{r}$ satisfies Equ. (F), are the calculated bifurcation points which are saved into the nodes associated with the branching vessels in the hierarchical digraph. On the basis of the vessel hierarchy digraph, the relationships of vessel correspondence among the multiple projections are established by traversal of the associated hierarchical digraphs via the descendant and sibling arcs.

Determination of Parameters of the Biplane Imaging System

Referring now to FIGS. 1, 2A–2B, 4, and step 28 of FIG. 1, the biplane imaging system includes a pair of single-plane imaging systems (FIGS. 2A–2B). Each X-ray source (or focal spot) functions as the origin of 3-D coordinate space and the spatial relationship between each imaging portion of the biplane system can be characterized by a transformation in the form of a rotation matrix R and a translation vector $\vec{t}$. In the first projection view, let ($u_i$, $v_i$) denote the image coordinates of the ith object point, located at position ($x_i$, $y_i$, $z_i$). We have $u_i = Dx_i/z_i$, $v_i = Dy_i/z_i$, where D is the perpendicular distance between the x-ray focal spot and the image plane. Let ($\xi_i$, $\eta_i$) denote scaled image coordinates, defined as $\xi_i = u_i/D = x_i/z_i$, $\eta_i = v_i/D = y_i/z_i$. The second projection view of the biplane imaging system can be described in terms of a second pair of image and object coordinate systems u'v' and x'y'z' defined in an analogous manner. Scaled image coordinates ($\xi'_i$, $\eta'_i$) in the second view (second projection image) for the ith object point at position ($x'_i$, $y'_i$, $z'_i$) are given by $\xi'_i = u'_i/D' = x'_i/z'_i$, $\eta'_i = v'_i/D' = y'_i/z'_i$. The geometrical relationship between the two views can be characterized by $$\begin{bmatrix} x'_i \\ y'_i \\ z'_i \end{bmatrix} = R \cdot \left\{ \begin{bmatrix} x_i \\ y_i \\ z_i \end{bmatrix} - \vec{t} \right\} = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} x_i - t_x \\ y_i - t_y \\ z_i - t_z \end{bmatrix}. \quad \text{Equ. (1)}$$

Figure 4:
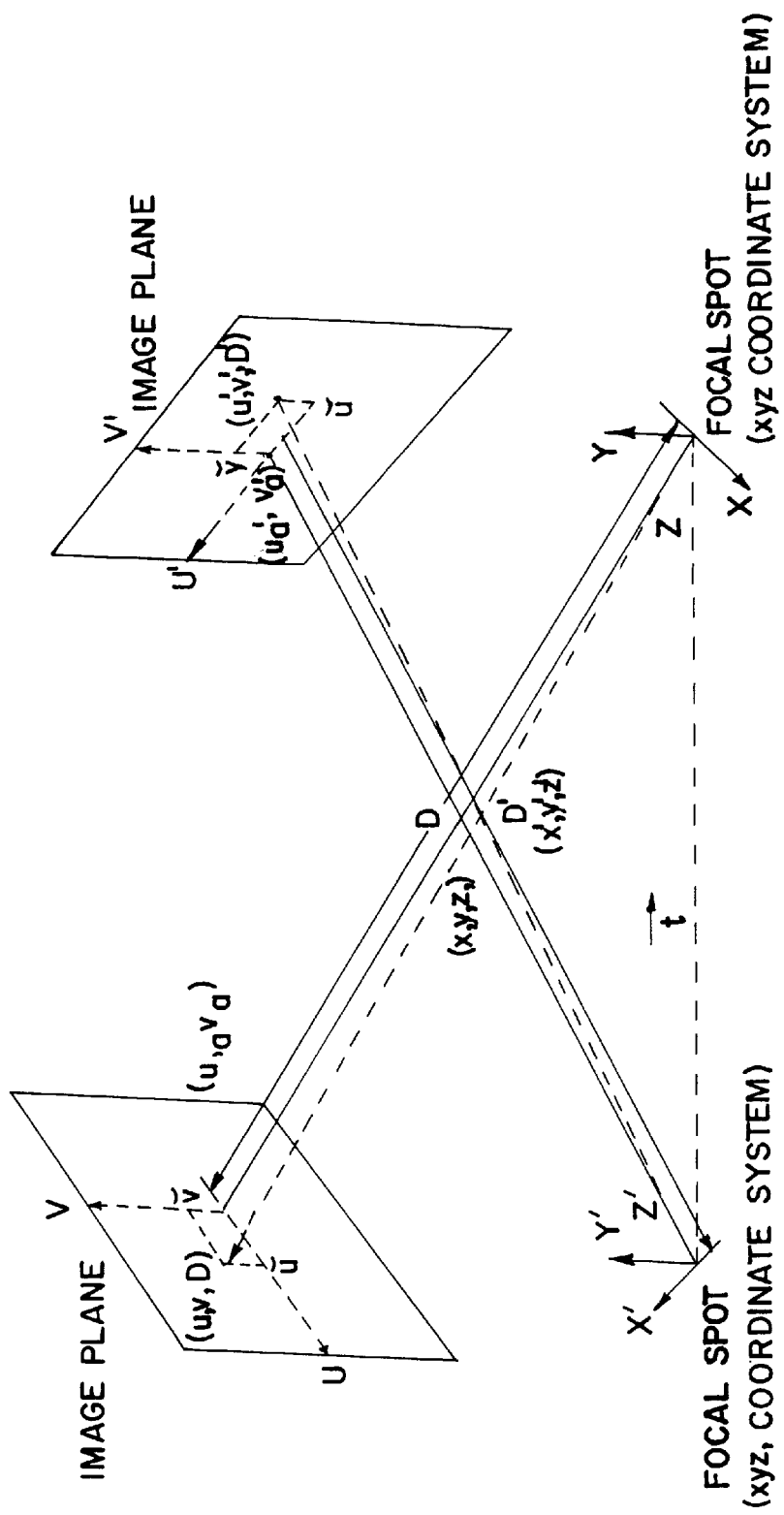
FIG. 4 is a schematic view of a specific embodiment of a biplane imaging system model for defining a 3-D object point in the 3-D coordinate systems xyz and x'y'z' and their projections in the 2-D image plane coordinate systems uv and u'v', respectively, according to the present invention.

FIG. 4 illustrates the graphical representation of the biplane system defined by a mathematical model. In the inventive method, the required prior information (i.e., the intrinsic parameters of each single-plane imaging system) for determination of biplane imaging geometry includes: (1) the distance between each focal spot and its image plane, SID (focal-spot to imaging-plane distance), (2) the pixel size, $P_{size}$ (e.g., 0.3 mm/pixel), (3) the distance $\vec{t}$ between the two focal spots or the known 3-D distance between two points in the projection images, and (4) for each view, an approximation of the factor MF (e.g., 1.2), which is the ratio of the SID and the approximate distance of the object to the focal spot. Item (4), immediately above, is optional but may provide a more accurate estimate if it is available.

An essential step in feature-based 3-D reconstruction from two views relies on the accurate establishment of correspondence in image features, such as points or curve segments between projections, as is illustrated in step 32 of FIG. 1. The bifurcation points on the vascular tree are prominent features and can often be recognized in both images to facilitate the determination of biplane imaging geometry. Because the vessel correspondences are maintained based on the hierarchical digraphs, the correspondences of bifurcation points are inherently established and can be retrieved by traversing the associated hierarchical digraphs (data structures). The established pairs of bifurcation points are used for the calculation of the biplane imaging geometry. Note that the "pincushion distortions" on bifurcation points and image points are corrected first before the estimation of biplane imaging geometry proceeds. The correction of pincushion error can be implemented based on known algorithms. For example, a method described in a publication entitled "Correction of Image Deformation from Lens Distortion Using Bezier Patches", *Computer Viusion, Graphics Image Processing,* Vol. 47, 1989, pp. 385–394, may be used, as is known in the art. In the present inventive method, the pincushion distortion does not considerably affect the accuracy of the 3-D reconstruction due to the small field of view (i.e., 100 cm SID and 17 cm×17 cm II). The prior information (SID, $P_{size}$, MF) and the 2-D inputs are employed to serve as constraints such that the intermediate solutions resulting from each iterative calculation remains in the vicinity of the true solution space and converges to an "optimal" solution.

Initial Estimates of Biplane Imaging Geometry

When the input data error of corresponding points is moderate (e.g., less than 1 pixel ≈0.3 mm RMS error in coronary angiography), the estimate of the 3-D imaging geometry provided by the linear algorithm is generally sufficient to ensure proper convergence for further optimization. Such a linear algorithm is described in a publication by C. E. Metz and L. E. Fencil entitled "Determination of three-dimensional structure in biplane radiography without prior knowledge of the relationship between the two views: Theory," *Medical Physics,* 16 (1), pp. 45–51, January/February 1989, as is known in the art.

However, when input data error is large, the initial estimate provided by the linear algorithm may be grossly inaccurate, and the minimization procedure may become trapped in a local minimum. In the problem of biplane angiography, the centroid of a target object or the region of interest to be imaged is usually aligned with the isocenter of the imaging system as closely as possible such that the content of projection image includes the desired focus of attention at any viewing angle. The isocenter is the location between the focal spot and image intensifier with respect to the rotary motion of the gantry arm, as illustrated in FIGS. 2A–2B. It is usually measured as the relative distance from the focal spot. Hence, the information with respect to the isocenter is employed and converted to the approximate MF value if the distance between the object and focal spot is not available.

The required initial estimates include a rotation matrix $$\overline{R}$$

a unit translation vector $$\vec{t}_{\overline{u}'}$$

a scaled 3-D points $$\overrightarrow{p'_i} = (\overline{x}'_i, \overline{y}'_i, \overline{z}'_i), i = 1, 2, \ldots, n.$$

With large amounts of noise on the input of the 2-D corresponding points extracted from the biplane images, the estimated imaging geometry, as well as the 3-D objects by use of the linear algorithm may considerably deviate from the real solution and, therefore are not suitable to serve as the initial estimate for the refinement process. Such a situation can be identified if (1) not all of the calculated 3-D points are in front of both (or all) focal spots, (2) the RMS image point errors are large (e.g., >50 pixels) or (3) the projections of the calculated 3-D points are not in the image plane. To remedy this problem, the estimates of $$\overline{R}, \vec{t}_{\overline{u}} \text{ and } \overrightarrow{p'_i}\text{'s}$$

must be redefined so that their values are in compliance with the initial biplane geometry set-up for the optimization. Without loss of generality, the initial estimates of the z and z' axes of the two imaging systems are taken to be orthogonal in this situation, and the unit translation vector is set to be on the x-z plane. Let ($\alpha$, $\alpha'$) and (D, D'), denote the MF factors and SID of the biplane imaging systems in xyz and x'y'z' coordinates, respectively. Two different initial solutions $$(\overline{R}_1, \vec{t}_{\overline{u}_1}) \text{ and } (\overline{R}_2, \vec{t}_{\overline{u}_2}) \quad \text{Equ. (2)}$$

$$\overline{R}_1 = \begin{bmatrix} 0 & 0 & -1 \\ 0 & 1 & 0 \\ 1 & 0 & 0 \end{bmatrix}, \vec{t}_{\overline{u}_1} = \begin{bmatrix} -\frac{D'}{\alpha' \cdot t_d} \\ 0 \\ \frac{D}{\alpha \cdot t_d} \end{bmatrix},$$

$$\text{and } \overline{R}_2 = \begin{bmatrix} 0 & 0 & 1 \\ 0 & 1 & 0 \\ -1 & 0 & 0 \end{bmatrix}, \vec{t}_{\overline{u}_2} = \begin{bmatrix} -\frac{D'}{\alpha' \cdot t_d} \\ 0 \\ \frac{D}{\alpha \cdot t_d} \end{bmatrix},$$

where $t_d$ represents the magnitude of $\vec{t}$. If the magnitude of $\vec{t}$ is not available, an approximated measurement is calculated as follows:

$$t_d = \sqrt{\left(\frac{D}{\alpha}\right)^2 + \left(\frac{D}{\alpha'}\right)^2}.$$

Figure 5:
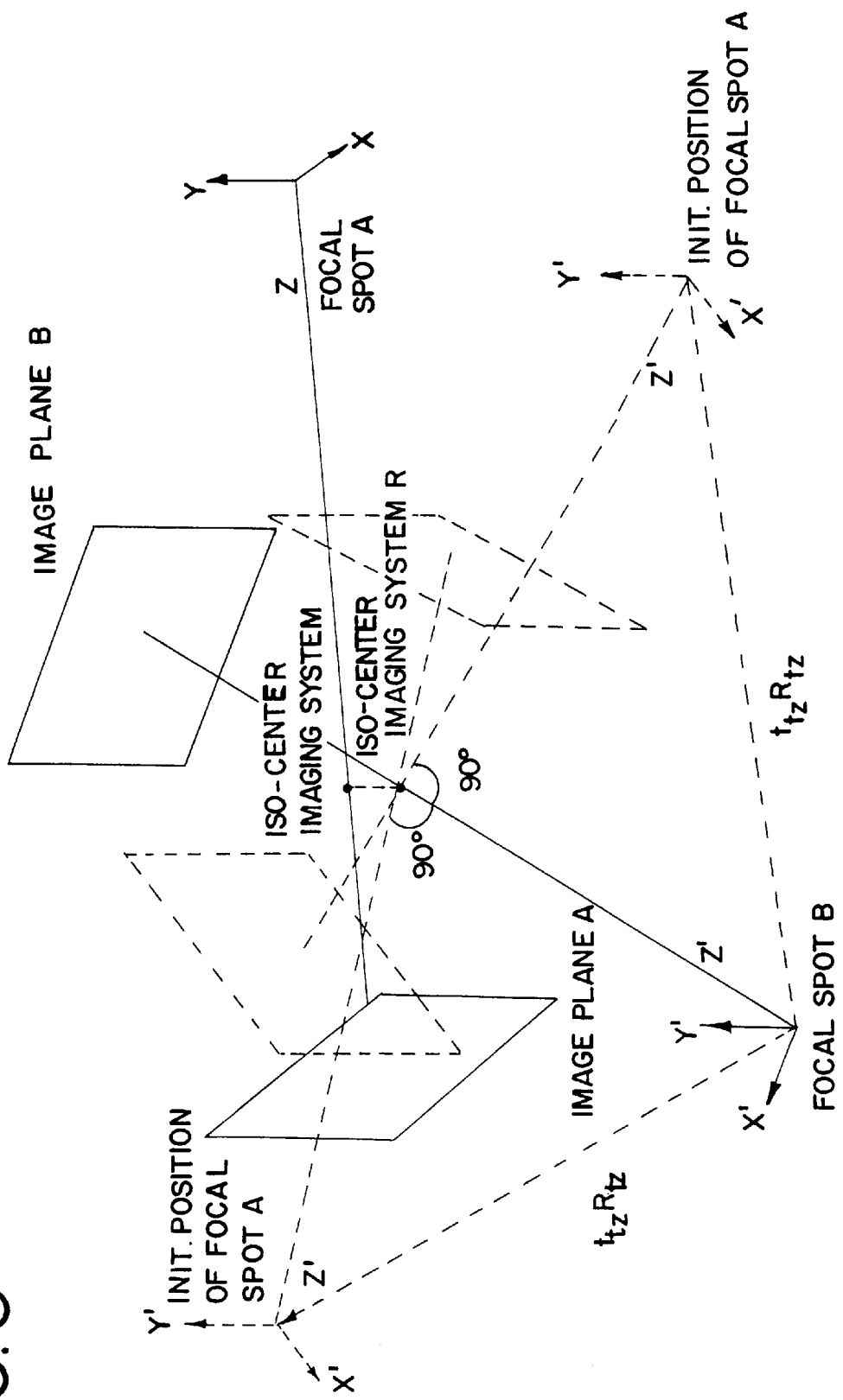
FIG. 5 is a schematic view showing two initial solutions used for searching the optimal solutions of imaging parameters as well as the 3-D object in the given biplane systems.

Referring now to FIG. 5, FIG. 5 illustrates the graphical representation of the predefined initial solutions. The scaled 3-D points ($\overline{x}'_i, \overline{y}'_i, \overline{z}'_i$) defined in the x'y'z' coordinate system are initialized as $$\overline{x}'_i = \frac{u'_i}{\alpha' \cdot t_d}, \overline{y}'_i = \frac{v'_i}{\alpha' \cdot t_d}, \overline{z}'_i = \frac{D'}{\alpha' \cdot t_d}, i = 1, \ldots n,$$

where ($u'_i$, $v'_i$) denotes the 2-D input points on image plane in the x'y'z' single-plane system.

Final Estimates Based on Constrained Optimization

Although the linear algorithm discussed above is computationally fast, the solution is not optimal in the presence of very noisy data (e.g., RMS error >1 pixel). Hence, it is potentially advantageous to employ another method aiming at global optimization to improve the accuracy of the solution in image locations of corresponding points. In the approach described herein, an objective function defined as the sum of squares of the Euclidean distances between the 2-D input data and the projections of the calculated 3-D data points is employed. Given the set of 2-D points extracted from the biplane images, an "optimal" estimate of the biplane imaging geometry and 3-D object structures is be obtained by minimizing:

$$\min_{P,P'} F_1(P, P') = \sum_{i=1}^{n} \left\{ \left(\xi_i - \frac{x_i}{z_i}\right)^2 + \left(\eta_i - \frac{y_i}{z_i}\right)^2 + \right. \quad \text{Equ. (3)}$$

$$\left. \left(\xi'_i - \frac{x'_i}{z'_i}\right)^2 + \left(\eta'_i - \frac{y'_i}{z'_i}\right)^2 \right\},$$

where n denotes the number of pairs of corresponding points extracted from the biplane images, and P and P' denote the sets of 3-D object position vectors $\vec{p}_i = (x_i, y_i, z_i)$ and $\vec{p}'_i = (x'_i, y'_i, z'_i)$, where i=1, . . . , n, respectively. The first two terms of the objective function $F_1(P,P')$ denote the square of distance between the input of image data and the projection of calculated 3-D data at the ith point. The last two terms are similarly defined as the square of 2-D distance error in the second image plane. Since the relationship between the two imaging systems can be characterized by a rotation matrix R and a translation vector $\vec{t} = [t_x, t_y, t_z]^t$, as shown in Eq. (1), Eq. (3) can be expressed as $$\min_{R, \vec{t}, P'} F_2(R, \vec{t}, P') = \sum_{i=1}^{n} \left\{ \left(\xi'_i - \frac{x'_i}{z'_i}\right)^2 + \right. \quad \text{Equ. (4)}$$

$$\left(\eta'_i - \frac{y'_i}{z'_i}\right)^2 + \left(\xi_i - \frac{\vec{c}_1 \cdot \vec{p}'_i + t_x}{\vec{c}_3 \cdot \vec{p}'_i + t_z}\right)^2 +$$

$$\left. \left(\eta_i - \frac{\vec{c}_2 \cdot \vec{p}'_i + t_y}{\vec{c}_3 \cdot \vec{p}'_i + t_z}\right)^2 \right\},$$

where $\vec{c}_k$ denotes the respective kth column vectors of matrix R. From a pair of projections, the 3-D objects can only be recovered up to a scale factor, at best. This fact is reflected by the inspection of each quotient term involving the 3-D points in Equ. (4) as follows:

$$\min_{R, \vec{t}_u, \hat{P}'} F_2(R, \vec{t}_u, \hat{P}') = \sum_{i=1}^{n} \left\{ \left(\xi'_i - \frac{x'_i/|\vec{t}|}{z'_i/|\vec{t}|}\right)^2 + \right. \quad \text{Equ. 5}$$

$$\left(\eta'_i - \frac{y'_i/|\vec{t}|}{z'_i/|\vec{t}|}\right)^2 +$$

-continued $$\left(\xi_i - \frac{(\vec{c}_1 \cdot \vec{p}'_i + t_x)/|\vec{t}|}{(\vec{c}_3 \cdot \vec{p}'_i + t_z)/|\vec{t}|}\right)^2 +$$

$$\left(\eta_i - \frac{(\vec{c}_2 \cdot \vec{p}'_i + t_y)/|\vec{t}|}{(\vec{c}_3 \cdot \vec{p}'_i + t_z)/|\vec{t}|}\right)^2 \right\},$$

$$= \sum_{i=1}^{n} \left\{ \left(\xi'_i - \frac{\hat{x}'_i}{\hat{z}'_i}\right)^2 + \left(\eta'_i - \frac{\hat{y}'_i}{\hat{z}'_i}\right)^2 + \right.$$

$$\left(\xi_i - \frac{\vec{c}_1 \cdot \vec{p}'_i + t_{u_x}}{\vec{c}_3 \cdot \vec{p}'_i + t_{u_z}}\right)^2 +$$

$$\left.\left(\eta_i - \frac{\vec{c}_1 \cdot \vec{p}'_i + t_{u_x}}{\vec{c}_3 \cdot \vec{p}'_i + t_{u_z}}\right)^2 \right\}$$

of norm 1, there exists a rotation R satisfying Eq. (6) and is defined as follows:

$$2\begin{bmatrix} s^2 + (w_1)^2 - \frac{1}{2} & w_1 w_2 - s w_3 & s w_2 + w_1 w_3 \\ w_1 w_2 + s w_3 & s^2 + (w_2)^2 - \frac{1}{2} & w_2 w_3 - s w_1 \\ w_1 w_3 - s w_2 & s w_1 + w_2 w_3 & s^2 + (w_3)^2 - \frac{1}{2} \end{bmatrix}$$ Equ. (7)

With this quaternion representation, Eq. (4) can be rewritten as:

$$\min_{\tilde{q}, \vec{t}_u, \hat{p}'} F_4(\tilde{q}, \vec{t}_u \hat{P}') = \sum_{i=1}^{n} \left[ \left\{\xi'_i - \frac{\hat{x}'_i}{\hat{z}'_i}\right\}^2 + \left\{\eta'_i - \frac{\hat{y}'_i}{\hat{z}'_i}\right\}^2 + \left\{\xi_i - \frac{2(s^2 + w_1^2 + 1/2)\hat{x}'_i + 2(w_1 w_2 + s w_3)\hat{y}'_i + 2(w_1 w_2 - s w_2)\hat{z}'_i + t_{u_x}}{2(s w_2 + w_1 w_3)\hat{x}'_i + 2(w_2 w_3 - s w_1)\hat{y}'_i + 2\left(s^2 + w_3^2 - \frac{1}{2}\right)\hat{z}'_i + t_{u_z}}\right\}^2 + \right.$$

$$\left.\left\{\eta_i - \frac{2(w_1 w_2 - s w_3)\hat{x}'_i + 2(s^2 + w_2^2 - 1/2)\hat{y}'_i + 2(s w_1 + w_2 w_3)\hat{z}'_i + t_{u_y}}{2(s w_2 + w_1 w_3)\hat{x}'_i + 2(w_2 w_3 - s w_1)\hat{y}'_i + 2\left(s^2 + w_3^2 - \frac{1}{2}\right)\hat{z}'_i + t_{u_z}}\right\}^2\right]$$ Equ. (8)

where $\hat{p}'$ denotes the set of scaled 3-D points $$\vec{p}_i = (\hat{x}'_i, \hat{y}'_i, \hat{z}'_i)$$

where i=1, ..., n, to within a scale factor of the magnitude of the translation vector $|\vec{t}|$ and where $[t_{u_x}, t_{u_y}, t_{u_z}]^T$ denotes the unit translation vector corresponding to $\vec{t}$.

It is well known that any 3-D rigid motion can be uniquely decomposed into a translation and a rotation by an angle θ around an axis $\vec{v}_u$ passing through the origin of the coordinate system. In the present inventive method, a quaternion denoted as $\tilde{q} = (s, \tilde{w}) = (s, w_1, w_2, w_3)$ of norm equal to 1 is employed to represent the rotation transformation as $$\vec{w} = \sin(\theta/2) \vec{v}_u, \quad s = \cos(\theta/2).$$ Equ. (6)

Similarly, for any quaternion $\tilde{q} = (s, \vec{w}) = (s, w_1, w_2, w_3)$ subject to the constraints:

$C_1$: $s^2 + (w_1)^2 + (w_2)^2 + (w_3)^2 = 1$ $C_2$: $(t_{u_x})^2 + (t_{u_y})^2 + (t_{u_z})^2 = 1$ $C_3$: $0 < \hat{z}'_i, i = 1, \ldots, n$ $C_4$: $0 < 2(s w_2 + w_1 w_3)\hat{x}'_i + 2(w_2 w_3 - s w_1)\hat{y}'_i +$ $$2\left(s^2 + (w_3)^2 - \frac{1}{2}\right)\hat{z}'_i + t_{u_z} = \hat{z}_i, i = 1\ldots, n,$$

where constraint $C_1$ characterizes the quaternion norm, constraint $C_2$ ensures a unit translation vector, and constraints $C_3$ and $C_4$ force the scaled coordinates $\hat{z}'_i$ and $\hat{z}_i$ to be in front of the respective focal spots.

If the isocenter distances of employed biplane imaging systems or MF factors are available, the constraints $C_3$ and $C_4$ in Eq. (8) can be modified as:

$C_3$: $\frac{d' - \delta h}{|\vec{t}|} < \hat{z}'_i < \frac{d' + \delta h}{|\vec{t}|}, i = 1, \ldots, n$ $C_4$: $\frac{d - \delta h}{|\vec{t}|} < \hat{z}_i = 2\left[(s w_2 + w_1 w_3)\hat{x}'_i + (w_2 w_3 - s w_1)\hat{y}'_i + \right.$ $$\left.\left(s^2 + (w_3)^2 - \frac{1}{2}\right)\hat{z}'_i\right] + t_{u_z} < \frac{d + \delta h}{|\vec{t}|}$$

$i = 1, \ldots, n,$ where d=D/α and d'=D'/α' are the approximate distances between the object's centroid and the respective focal spots, α and α' denote the MF factors and $\delta_h$ (≈12.5±2.0 cm) denotes the maximal length of the heart along a long-axis view at end-diastole, as is known and described by A. E.

Weyman in a publication entitled "*Cross-Sectional Echocardiography,*" Lea & Febiger, Philadelphia, 1982. For each 3-D object point, the ray connecting that point and the focal spot intersects the image plane near the associated 2-D image point, even when the input data is corrupted by noise. In addition to the constraints imposed on the z and z' coordinates, two other constrains are incorporated to confine the x, x', y, and y' coordinates of each calculated 3-D point as follows:

For each 3-D object point, the ray connecting that point and the focal spot intersects the image plane near the associated 2-D image point, even when the input data are corrupted by noise. In addition to the constraints imposed on the z and z' coordiantes, two other constraints are incorporated to confine the x, x', y, and y' coordinates of each calculated 3-D point as follows:

$$C_5: \left(\frac{\hat{x}_i}{\hat{z}_i} - \xi_i\right)^2 + \left(\frac{\hat{y}_i}{\hat{z}_i} - \eta_i\right)^2 \le \left(\frac{\delta_c}{Dp_{size}}\right)^2, i = 1, \ldots, n,$$

$$C_6: \left(\frac{\hat{x}'_i}{\hat{z}'_i} - \xi'_i\right)^2 + \left(\frac{\hat{y}'_i}{\hat{z}'_i} - \eta'_i\right)^2 \le \left(\frac{\delta_c}{D'p_{size}}\right)^2, i = 1, \ldots, n,$$

where $\delta_c$ defines the radius of a circular disk (e.g., 20 pixels) centered at ($\xi_i$, $\eta_i$) or ($\xi'_i$, $\eta'_i$) and $p_{size}$ represents the pixel size.

Figure 6:
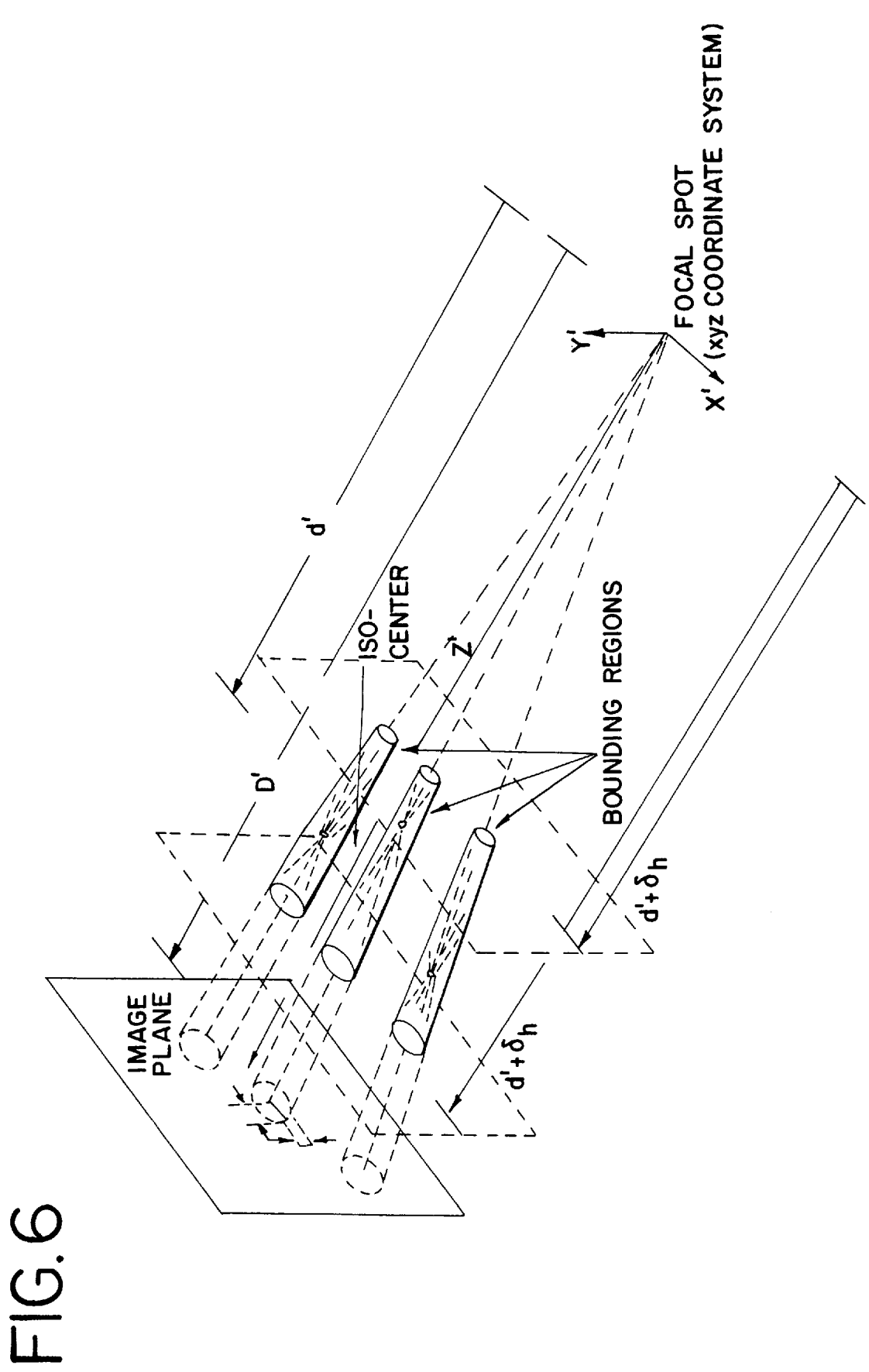
FIG. 6 is a schematic view showing cone-shape bounding regions associated with the calculated 3-D points.

Referring now to FIG. 6, FIG. 6 shows the bounding regions based on the employed constraint $C_3$ to $C_6$ in x'y'z' system. If two initial solutions are employed (as described under the subheading of Initial Estimates of Biplane Imaging Geometry), in general, two sets of biplane imaging geometry and their associated 3-D scaled object points will be obtained:

$$[R_1, \vec{t}_{u_1}, (\hat{x}'_{1_i}, \hat{y}'_{1_i}, \hat{z}_{1_i}), i=1, \ldots n]$$

and $$[R_2, \vec{t}_{u_2}, (\hat{x}'_{2_i}, \hat{y}'_{2_i}, \hat{z}_{2_i}), i=1, \ldots n]$$

Figure 7:
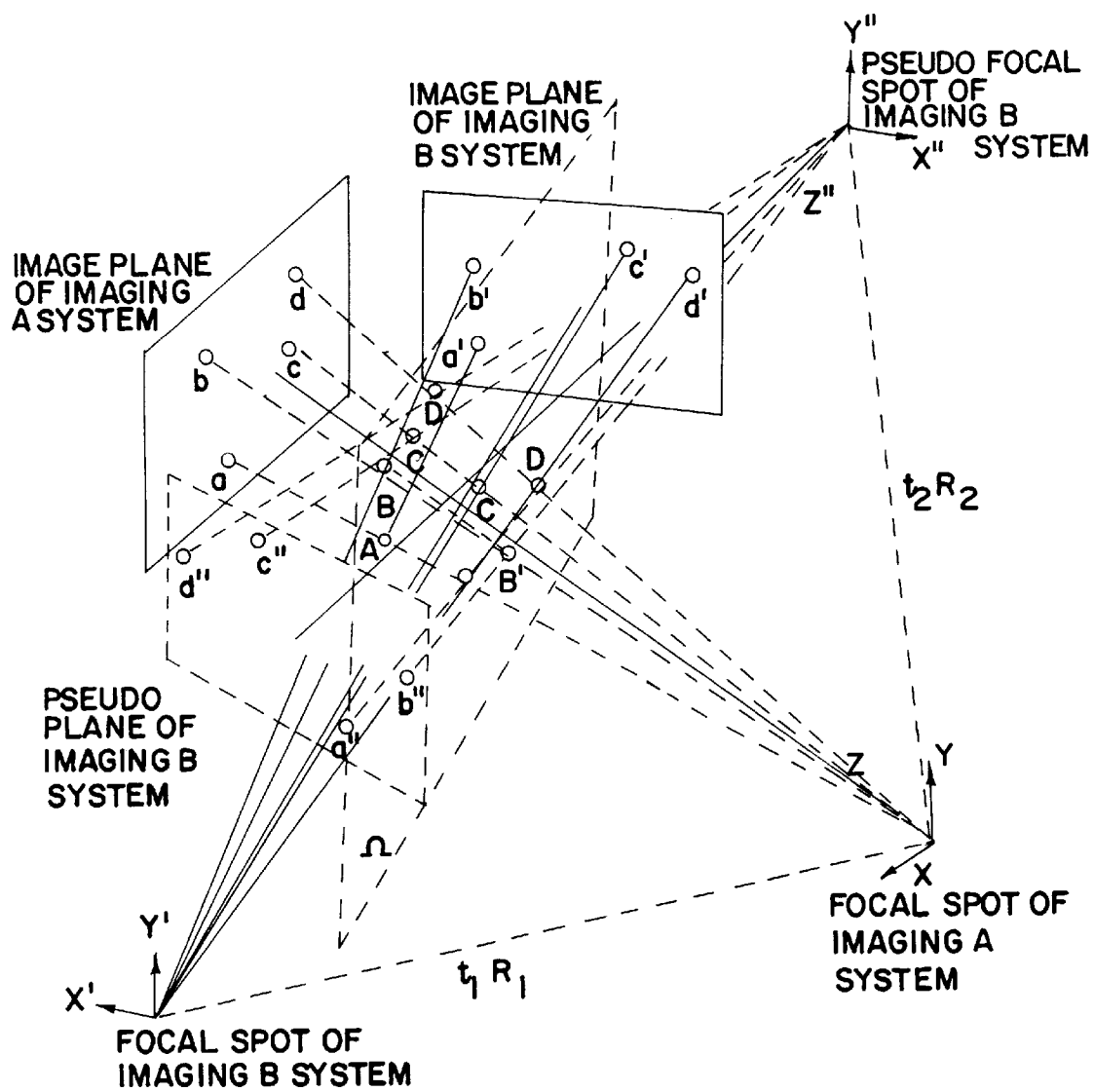
FIG. 7 is a schematic view showing two set-ups of a biplane imaging system resulting from the employed two initial conditions yielding two sets of reconstructed 3-D objects A'–D' and A–D (real 3-D object points) as shown in gray and black circles, respectively.

Referring now to FIG. 7, FIG. 7 illustrates a typical example by use of several object point RMS errors on image points associated with the true solutions defined by one imaging geometry (e.g., $R_1$ and $\vec{t}_{u_1}$)

is smaller than those defined by the other imaging geometry (e.g., $R_2$ and $\vec{t}_{u_2}$).

Therefore, the calculated imaging parameters, which have a smaller RMS error on the image points, are selected as the optimal solution. To determine the absolute size of the object, the magnitude of the translation vector (i.e., the distance between the two focal spots $\vec{t}$,)

or the real 3-D distance between any two object points projected onto the biplane images needs to be known. In the former case, the actual 3-D object points can be recovered easily by multiplying the scaled object points by the magnitude. Otherwise, the scale factor $S_f$ is calculated and employed to obtain the absolute 3-D object point as $$\begin{bmatrix} x_i \\ y_i \\ z_i \end{bmatrix} = S_f \cdot \begin{bmatrix} \hat{x}_i \\ \hat{y}_i \\ \hat{z}_i \end{bmatrix}, \text{where}$$

$$S_f = \frac{L_d}{\sqrt{(\hat{x}_{p_1} - \hat{x}_{p_2})^2 + (\hat{y}_{p_1} - \hat{y}_{p_2})^2 + (\hat{z}_{p_1} - \hat{z}_{p_2})^2}},$$

and $L_d$ denotes the known 3-D distance associated with the two scaled 3-D object points $(\hat{x}_{p_1}, \hat{y}_{p_1}, \hat{z}_{p_1})$ and $(\hat{x}_{p_2}, \hat{y}_{p_2}, \hat{z}_{p_2})$.

Recovery of 3-D Spatial Information

After the biplane imaging geometry that defines the two views is obtained, the orientation information is used to establish the point correspondences on vessel centerlines in the pair of images and is further used to calculate 3-D morphologic structures of coronary arterial tree, as is illustrated in step 34 of FIG. 1. The calculated imaging geometry in conjunction with the epipolar constraints are employed as the framework for establishing the point correspondences on the vessel centerlines based on the two identified 2-D coronary arterial trees.

According to the epipolar constraints, the correspondence of a point in one image must lie on the epipolar line in the other image. Two types of ambiguity may arise in the two-view correspondence problem: (1) the epipolar line may intersect more that one vessel in the coronary arterial tree, and (2) the epipolar line may intersect more than one point on a single vessel. The first ambiguity is resolved by means of the constructed hierarchical digraph defining the anatomy of the 2-D coronary arterial tree such that the epipolar constraints are applied iteratively to every pair of corresponding vessels in the two coronary trees. For example, the corresponding centerline points of the left anterior descending artery in the angiogram acquired from the first view is uniquely determine by finding the intersections of the epipolar line and the 2-D centerline of the left anterior descending artery in the angiogram acquired from the second view.

When the intersection point is calculated, each 2-D vessel centerline is modeled by a spline-based curve-fitting function $f(s)=(x_i, y_i)$, $0 \le s \le 1$ (the same method used for calculation of bifurcation points described above) where s is the parametric argument defining the location of points $(x_i, y_i)$ on the vessel centerline. If there are n intersection points between the epipolar line and the vessel centerline due to the tortuous vessel shape, the locations of these points can be defined based on the parametric arguments (e.g., $f(s_1), f(s_2), \ldots f(s_n)$, $s_1=0.2, s_2=0.35, \ldots, s_n=0.5$). The point with the parametric argument $s_k$, $1 \le k \le n$ is selected as the desired corresponding point if $s_k$ is the smallest value larger than the parametric argument of the last detected corresponding point. Based on such a method, the second type of ambiguity is resolved.

With the point correspondences on 2-D vessel centerlines ($\xi_i$, $\eta_i$) and ($\xi'_i$, $\eta'_i$) and the imaging geometry, the 3-D centerline points of coronary arteries $(x_i, y_i, z_i)$'s can then be calculated based on the following equations:

$$\begin{bmatrix} r_{11} - r_{31}\xi'_i & r_{12} - r_{32}\xi'_i & r_{13} - r_{33}\xi'_i \\ r_{21} - r_{31}\eta'_i & r_{22} - r_{32}\eta'_i & r_{23} - r_{33}\eta'_i \\ 1 & 0 & -\xi_i \\ 0 & 1 & -\eta_i \end{bmatrix} \cdot \begin{bmatrix} x_i \\ y_i \\ z_i \end{bmatrix} = \begin{bmatrix} \vec{a} \cdot \vec{t} \\ \vec{b} \cdot \vec{t} \\ 0 \\ 0 \end{bmatrix}, \quad \text{Equ. (9)}$$

where $\vec{a}$ and $\vec{b}$ are two vectors defined as follows:

$$\vec{a} = \begin{bmatrix} (r_{11} - r_{31}\xi'_i) \\ (r_{12} - r_{32}\xi'_i) \\ (r_{13} - r_{33}\xi'_i) \end{bmatrix}, \vec{b} = \begin{bmatrix} (r_{21} - r_{31}\eta'_i) \\ (r_{22} - r_{32}\eta'_i) \\ (r_{23} - r_{33}\eta'_i) \end{bmatrix}, \quad \text{Equ. (10)}$$

and $r_{ij}$ denotes the component of the rotation matrix R.

Rendering of Reconstructed 3-D Coronary Tree and Estimation of an Optimal View

After the 3-D vessel centerlines are obtained which define the 3-D location of the arterial tree, as shown in step 34 of FIG. 1, the anatomical morphology of the arterial tree is generated by a surface based reproduction technique, as illustrated in step 36 of FIG. 1, as is known in the art. Such a surface based reproduction technique is described by S. Y. Chen, K. R. Hoffmann, C. T. Chen, and J. D. Carroll in a publication entitled "Modeling the Human Heart based on Cardiac Tomography," *SPIE*, vol. 1778, 1992, pp. 14–18.

The 3-D lumen surface is represented by a sequence of cross-sectional contours. Each contour $V_i$ along the vessel is represented by a $d_i$-mm circular disk centered at and perpendicular to the 3-D vessel centerline. The surface between each pair of consecutive contours $V_i$ and $V_{i+1}$ is generated based upon a number of polygonal patches. Utilizing the modeled lumen surfaces, the morphology of the reconstructed coronary arterial tree is reproduced by employing the technique of computer graphics, as is known in the art.

When an arbitrary computer-generated image is produced, the gantry information defining the current projection is calculated in the form of LAO/RAO (on the y-z plane) and CAUD/CRAN (on the x-z plane) angles by which the gantry arm moves along the LAO/RAO angle followed by the CAUD/CRAN angle. The focal spot of the gantry can be formulated as $$R_x(\gamma)R_y(-\beta) = \begin{bmatrix} 1 & 0 & 0 \\ 0 & \cos(\gamma) & \sin(\gamma) \\ 0 & -\sin(\gamma) & \cos(\gamma) \end{bmatrix} \cdot \begin{bmatrix} \cos(-\beta) & 0 & -\sin(-\beta) \\ 0 & 1 & 0 \\ \sin(-\beta) & 0 & \cos(-\beta) \end{bmatrix} \quad \text{Equ. (11)}$$

$$= \begin{bmatrix} \cos(-\beta) & 0 & -\sin(\beta) \\ \sin(\gamma)\sin(-\beta) & \cos(\gamma) & \sin(\gamma)\cos(-\beta) \\ \cos(\gamma)\sin(-\beta) & -\sin(\gamma) & \cos(\gamma)\cos(-\beta) \end{bmatrix},$$

where $R_x$ and $R_y$ denote the rigid rotations with respect to the x-axis and y-axis, respectively, and where $\gamma$ and $\beta$ denote the LAO and CAUD angles, respectively.

Let $p_i$, i=0, 1, . . . , m denote the points on the centerline of a 3-D vessel. Let $$\vec{1}_j = [1_{j_x}, 1_{j_y}, 1_{j_z}]^t \text{ and } 1_j, j=1,2,\ldots, m$$

denote the vector and length of the segments between $p_{j-1}$ and $p_j$, respectively. The minimal foreshortening of the vessel segments are obtained in terms of the gantry orientation ($\gamma$ and $\beta$ angles) by minimizing the objective function as follows:

$$\min_{\gamma,\beta} F(p_i, \gamma, \beta) = \sum_{j=1}^{m} \left\| \vec{1}_j \cos(\theta_j) \right\|^2 \quad \text{Equ. (12)}$$

$$= \sum_{j=1}^{m} \left( \vec{1}_j \cdot \vec{z} \right)^2,$$

subject to the constraints $$-90° < \gamma < 90°, \; -40° < \beta < 40°,$$

where "·" denotes the inner product and $\theta_j$ is the angle between the directional vector $\vec{1}_j$ and the projection vector $\vec{z}_p$ is defined as $$\vec{z}_p = \begin{bmatrix} -\cos(\gamma)\sin(\beta) \\ -\sin(\gamma) \\ \cos(\gamma)\cos(\beta) \end{bmatrix}. \quad \text{Equ. (13)}$$

In prior art methods, due to the problem of vessel overlap and vessel foreshortening, multiple projections are necessary to adequately evaluate the coronary arterial tree using arteriography. Hence, the patient may receive additional or unneeded radiation and contrast material during diagnostic and interventional procedures. This known traditional trial and error method may provide views in which overlapping and foreshortening are somewhat minimized, but only in terms of the subjective experience-based judgement of the angiographer. In the present inventive method, the reconstructed 3-D coronary arterial tree can be rotated to any selected viewing angle yielding multiple computer-generated projections to determine for each patient which standard views are useful and which are of no clinical value due to excessive overlap. Therefore, the 3-D computer assistance provides a means to improve the quality and utility of the images subsequently acquired.

Experimental Results

The accuracy of the present inventive method was evaluated by use of bifurcation points in a computer-simulated coronary arterial tree. For assessment of the rotation matrix, R is further decomposed into a rotation around an axis $\vec{v}_u$ (a unit vector) passing through the origin of the coordinate system with the angle $\theta$. The differences between the calculated and real rotation axes $E_{\vec{v}}$ and rotation angles $E_\theta$ are employed for error analysis. The error in the translation vector $E_{\vec{t}}$ is the angle between the real and calculated translation vectors. The error in the 3-D absolute position $E_{3d}$ is defined as the RMS distance between the calculated and the real 3-D data sets; while the error in the 3-D configuration $$E_{\vec{3}d}$$

is defined as the RMS distance between the calculated and the real 3-D data sets after the centroids of these two data sets have been made to coincide. In simulated experiments, the parameters of the biplane imaging geometry were varied to investigate the effects of the system geometry on the accuracy with which the 3-D point positions could be recovered. Both D and D' were equal to 100 cm.

To assess the reliability of the technique under realistic conditions, a set of experiments was simulated by adding independent errors to the 2-D vessel centerlines resulting from the projection of the simulated 3-D arterial tree. The effect of the relative angle between the biplane imaging views was assessed by varying ø from 30° to 150°. By use of the computer simulated coronary arterial tree, RMS errors in angles defining the R matrix and $\vec{t}$ vector were less than 0.5 ($E_{\vec{v}}$), 1.2 ($E_\theta$), and 0.7 ($E_{\vec{t}}$) degrees, respectively, when ten corresponding points were used with RMS normally distributed errors varying from 0.7–4.2 pixels (0.21–1.32 mm) in fifty configurations; when only the linear based Metz-Fencil method was employed, the respective errors varied from 0.5–8.0 degrees, 6.0–40.0 degrees, and 3.7–34.1 degrees. The simulation shows substantial improvement in the estimation of biplane imaging geometry based on the new technique, which facilitates accurate reconstruction of 3-D coronary arterial structures. The RMS errors in 3-D absolute position ($E_{3d}$) and configuration $$(E_{\overline{3d}})$$

of the reconstructed arterial tree were 0.9–5.5 mm and 0.7–1.0 mm, respectively. The following table shows one of the simulation results based on an orthogonal biplane set-up:

| RMS error in 2-D centerlines | Error in imaging parameters | | | | RMS error in 3-D | |
|---|---|---|---|---|---|---|
| (pixel) | $E_{\vec{v}}$ | $E_\theta$ | $E_f$ | $E_{shift}$ | $E_{\overline{3d}}$ | $E_{3d}$ |
| 0.5 | 0.30° | 0.61° | 0.11° | 1.8 mm | 1.08 mm | 0.9 mm |
| 1.0 | 0.33° | 0.72° | 0.40° | 6.4 mm | 1.37 mm | 3.7 mm |
| 1.5 | 0.49° | 1.19° | 0.64° | 10.2 mm | 1.56 mm | 5.5 mm |
| 2.0 | 0.40° | 0.65° | 0.64° | 6.5 mm | 1.79 mm | 3.6 mm |
| 2.5 | 0.42° | 0.95° | 0.40° | 6.4 mm | 0.74 mm | 2.8 mm |
| 3.0 | 0.42° | 0.86° | 0.40° | 6.5 mm | 0.96 mm | 2.3 mm | where $$E_{\vec{v}}$$

denotes the deviation angle between the true $\vec{v}$ and the calculated $\vec{v}'$ rotational axes and $E_\theta$ denotes the angle difference between the true θ and the calculated θ' rotational angles.

Note that the 3-D absolute position error is due primarily to displacement error $E_{shift} = (D_{f-f'} \cdot E_{\vec{t}})$ that results from inaccurate estimation of the translation vector, where $D_{f-f'}$ is the distance between the focal spots of two imaging systems and $E_{\vec{t}}$ denotes the deviation angle between the real and calculated translation vectors. The RMS error in the 3-D configuration $$(E_{\overline{3d}})$$

decreases due to the reduction of the displacement error after the centroids of the real and calculated data are made to coincide. In general, the results show a great similarity between the reconstructed and the real 3-D vessel centerlines. The simulation shows highly accurate results in the estimation of biplane imaging geometry, vessel correspondences (less than 2 mm RMS error), and 3-D coronary arterial structures (less than 2 mm RMS error in configuration and 0.5 cm RMS error in absolute position, respectively) when a computer-simulated coronary arterial tree is used.

Angiograms of fifteen patients were analyzed where each patient had multiple biplane image acquisitions. The biplane imaging geometry was first determined without the need of a calibration object, and the 3-D coronary arterial trees including the left and the right coronary artery systems were reconstructed. Similarity between the real and reconstructed arterial structures was excellent.

Conclusions

The present inventive method is novel in several ways: (1) the 3-D coronary vasculature is reconstructed from a pair of projection angiograms based on a biplane imaging system or multiple pairs of angiograms acquired from a single-plane system in the same phase of the cardiac cycle at different viewing angles without use of a calibration object to achieve accuracies in magnification and imaging geometry of better than 2% and three degrees, respectively; (2) a beating 3-D coronary vasculature can be reproduced throughout the cardiac cycles in the temporal sequences of images to facilitate the study of heart movement; (3) the choice of an optimal view of the vasculature of interest can be achieved on the basis of the capability of rotating the reconstructed 3-D coronary arterial tree; and (4) the inventive method can be implemented on most digital single-plane or biplane systems. A calculated 3-D coronary tree for each patient predicts which projections are clinically useful thus providing an optimal visualization strategy which leads to more efficient and successful diagnostic and therapeutic procedures. The elimination of coronary artery views with excessive overlap may reduce contrast and radiation.

Note that the present inventive method is not limited to X-ray based imaging systems. For example, suitable imaging systems may include particle-beam imaging systems, radar imaging systems, ultrasound imaging systems, photographic imaging systems, and laser imaging systems. Such imaging systems are suitable when perspective-projection images of the target object are provided by the systems.

Please refer to Appendix A for a source code listing of the above-described method. The software is written in C Progranuning Language including GL Graphics Library Functions and Tk. Tcl Library functions compiled on a Unix-based C Compiler.

Specific embodiments of a method and apparatus for three-dimensional reconstruction of coronary vessels from angiographic images according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for three-dimensional reconstruction of a target object from two-dimensional images, said target object having a plurality of branch-like vessels, the method comprising the steps of:

a) placing the target object in a position to be scanned by an imaging system, said imaging system having a plurality of imaging portions;

b) acquiring a plurality of projection images of the target object, each imaging portion providing a projection image of the target object, each imaging portion disposed at an unknown orientation relative to the other imaging portions;

c) identifying two-dimensional vessel centerlines for a predetermined number of the vessels in each of the projection images;

d) creating a vessel hierarchy data structure for each projection image, said data structure including the identified two-dimensional vessel centerlines defined by a plurality of data points in the vessel hierarchy data structure;

e) calculating a predetermined number of bifurcation points for each projection image by traversing the corresponding vessel hierarchy data structure, said bifurcation points defined by intersections of the two-dimensional vessel centerlines;

f) determining a transformation in the form of a rotation matrix and a translation vector utilizing non-linear constrained minimization techniques and the bifurcation points corresponding to each of the projections images, said non-linear constrained minimization techniques minimizing the square of the distance between the bifurcation points and projections of calculated three-dimensional points, said rotation matrix and said translation vector representing imaging parameters corresponding to the orientation of each imaging portion relative to the other imaging portions of the imaging system;

g) utilizing the data points and the transformation to establish a correspondence between the two-dimensional vessel centerlines corresponding to each of the projection images such that each data point corresponding to one projection image is linked to a data point corresponding to the other projection images, said linked data points representing an identical location in the vessel of the target object;

h) calculating three-dimensional vessel centerlines utilizing the two-dimensional vessel centerlines and the correspondence between the data points of the two-dimensional vessel centerlines; and i) reconstructing a three-dimensional visual representation of the target object based on the three-dimensional vessel centerlines and diameters of each vessel estimated along the three-dimensional centerline of each vessel.

2. The method of claim 1 wherein the two-dimensional images are two-dimensional angiographic projection images.

3. The method of claim 1 wherein the target object is scanned substantially simultaneously by the plurality of imaging portions of the imaging system.

4. The method of claim 3 wherein a moving target object experiences substantially no movement during said substantially simultaneous scanning such that the projection images provided by the plurality of imaging portions represent images of the target object acquired substantially at a same point in time.

5. The method of claim 1 wherein the imaging system is a biplane imaging system having two imaging portions, said imaging portions configured to simultaneously scan the target object and provide biplane projection images of the target object.

6. The method of claim 1 wherein the imaging system is an X-ray based projection imaging system.

7. The method of claim 1 wherein the imaging system is selected from the group of non-orthogonal imaging systems consisting of X-ray imaging systems, particle-beam imaging systems, radar imaging systems, ultrasound imaging systems, photographic imaging systems, and laser imaging systems.

8. The method of claim 1 wherein the step of identifying the two-dimensional vessel centerlines includes the steps of determining a maximum vessel diameter at a beginning portion of the vessel and determining a minimum vessel diameter at an ending portion of the vessel.

9. The method of claim 1 wherein the step of identifying the two-dimensional vessel centerlines is performed by a human operator.

10. The method of claim 1 wherein the step of identifying the two-dimensional vessel centerlines includes the step of identifying at least six vessels in each projection image.

11. The method of claim 10 wherein the step of identifying at least six vessels in each projection image permits five bifurcation points to be calculated.

12. The method of claim 1 wherein the predetermined number of bifurcation points calculated for each projection image is at least five bifurcation points.

13. The method of claim 1 wherein the step of reconstructing the visual representation of the target object includes the steps of modeling the target object by calculating estimated vessel diameters along the three-dimensional centerline of each vessel based on the minimum and maximum diameter and a predetermined change in diameter per unit length along the vessel.

14. The method of claim 1 wherein the step of reconstructing a visual representation of the target object further includes the steps of:

a) providing an optimal three-dimensional visual representation of the target object such that vessel overlap and vessel foreshortening are minimized in the visual representation by rotating the three-dimensional visual representation in at least one of three dimensions;

b) calculating image parameters corresponding to the rotated three-dimensional visual representation; and c) providing said calculated parameters to the imaging system to permit the imaging system to further scan the target object such that optimal projection images of the target object are produced.

15. The method of claim 1, wherein said imaging system has an isocenter, and wherein said non-linear constrained minimization techniques are constrained by said isocenter.

16. A method for three-dimensional reconstruction of a target object from two-dimensional images, said target object having a plurality of branch-like vessels, the method comprising the steps of:

a) placing the target object in a position to be scanned by a biplane imaging system, said biplane imaging system having first and second imaging portions;

b) acquiring biplane projection images of the target object, each imaging portion providing a biplane projection image of the target object, each imaging portion disposed at an unknown orientation relative to the other imaging portion;

c) identifying two-dimensional vessel centerlines for a predetermined number of the vessels in each of the biplane projection images;

d) creating a vessel hierarchy data structure for each biplane projection image, said data structure including the identified two-dimensional vessel centerlines defined by a plurality of data points in the vessel hierarchy data structure;

e) calculating a predetermined number of bifurcation points for each biplane projection image by traversing the corresponding vessel hierarchy data structure, said bifurcation points defined by intersections of the two-dimensional vessel centerlines;

f) determining a transformation in the form of a rotation matrix and a translation vector utilizing non-linear constrained minimization techniques and the bifurcation points corresponding to each of the biplane projections images, said non-linear constrained minimization techniques minimizing the square of the distance between the bifurcation points and projections of calculated three-dimensional points, said rotation matrix and said translation vector representing biplane imaging parameters corresponding to the orientation of each imaging portion relative to the other imaging portion of the biplane imaging system;

g) utilizing the data points and the transformation to establish a correspondence between the two-dimensional vessel centerlines corresponding to each of the biplane projection images such that each data point corresponding to one biplane projection image is linked to a data point corresponding to the other biplane projection image, said linked data points representing an identical location in the vessel of the target object;

h) calculating three-dimensional vessel centerlines utilizing the two-dimensional vessel centerlines and the correspondence between the data points of the two-dimensional vessel centerlines; and i) reconstructing a three-dimensional visual representation of the target object based on the three-dimensional vessel centerlines and diameters of each vessel estimated along the three-dimensional centerline of each vessel.

17. The method of claim 16 wherein the two-dimensional images are two-dimensional angiographic projection images.

18. The method of claim 16 wherein the target object is scanned substantially simultaneously by the plurality of imaging portions of the biplane imaging system.

19. The method of claim 18 wherein a moving target object experiences substantially no movement during said substantially simultaneous scanning such that the projection images provided by the plurality of imaging portions represent images of the target object acquired substantially at a same point in time.

20. The method of claim 16 wherein the step of reconstructing a visual representation of the target object further includes the steps of:

a) providing an optimal three-dimensional visual representation of the target object such that vessel overlap and vessel foreshortening are minimized in the visual representation by rotating the three-dimensional visual representation in at least one of three dimensions;

b) calculating image parameters corresponding to the rotated three-dimensional visual representation; and c) providing said calculated parameters to the biplane imaging system to permit the imaging system to further scan the target object such that optimal projection images of the target object are produced.

21. The method of claim 16, wherein said biplane imaging system has a first isocenter corresponding to said first imaging portion and a second isocenter corresponding to said second imaging portion, and wherein said non-linear constrained minimization techniques are constrained by said first and second isocenters.

22. A method for three-dimensional reconstruction of a target object from two-dimensional images, said target object having a plurality of branch-like vessels, the method comprising the steps of:

a) placing the target object in a position to be scanned by a single-plane system, said imaging system having one imaging portion;

b) acquiring projection images of the target object, the imaging portion providing a plurality of projection images of the target object produced at different times, each projection image produced during an identical phase of a cardiac cycle of the target object, the imaging portion corresponding to one of the plurality of projection images disposed at an unknown orientation relative to the imaging portion corresponding to the others of the plurality of projection images;

c) identifying two-dimensional vessel centerlines for a predetermined number of the vessels in each of the projection images;

d) creating a vessel hierarchy data structure for each projection image, said data structure including the identified two-dimensional vessel centerlines defined by a plurality of data points in the vessel hierarchy data structure;

e) calculating a predetermined number of bifurcation points for each projection image by traversing the corresponding vessel hierarchy data structure, said bifurcation points defined by intersections of the two-dimensional vessel centerlines;

f) determining a transformation in the form of a rotation matrix and a translation vector utilizing non-linear constrained minimization techniques and the bifurcation points corresponding to each of the projections images, said non-linear constrained minimization techniques minimizing the square of the distance between the bifurcation points and projections of calculated three-dimensional points, said rotation matrix and said translation vector representing imaging parameters corresponding to the relative orientations of the imaging portion corresponding to the plurality of projection images;

g) utilizing the data points and the transformation to establish a correspondence between the two-dimensional vessel centerlines corresponding to each of the projection images such that each data point corresponding to one projection image is linked to a data point corresponding to the other projection images, said linked data points representing an identical location in the vessel of the target object;

h) calculating three-dimensional vessel centerlines utilizing the two-dimensional vessel centerlines and the correspondence between the data points of the two-dimensional vessel centerlines; and i) reconstructing a three-dimensional visual representation of the target object based on the three-dimensional vessel centerlines and diameters of each vessel estimated along the three-dimensional centerline of each vessel.

23. The method of claim 22, wherein said imaging system has an isocenter, and wherein said non-linear constrained minimization techniques are constrained by said isocenter.

* * * * *